United States Patent [19]
Frederick et al.

[11] Patent Number: 5,879,223
[45] Date of Patent: Mar. 9, 1999

[54] SHOT BLASTER WITH IMPELLER/BLOWER

[75] Inventors: William R. Frederick, Valley View; James J. Hansen, Broadview Heights, both of Ohio

[73] Assignee: AGA AB, Lindingo, Sweden

[21] Appl. No.: 867,287

[22] Filed: Jun. 2, 1997

[51] Int. Cl.⁶ ..................................................... B24C 3/26
[52] U.S. Cl. ............................................... 451/85; 451/75
[58] Field of Search .................................. 451/88, 86, 75, 451/85, 326, 328, 33, 89, 87, 98, 97; 241/DIG. 37

[56] References Cited

U.S. PATENT DOCUMENTS

| | | |
|---|---|---|
| 2,020,447 | 11/1935 | Wilson . |
| 2,127,274 | 8/1938 | Steuart . |
| 2,887,826 | 5/1959 | Schultz . |
| 3,008,274 | 11/1961 | Welter . |
| 3,368,308 | 2/1968 | Physoic, III . |
| 4,312,156 | 1/1982 | McWhorter . |
| 4,519,812 | 5/1985 | Brull et al. . |
| 4,524,548 | 6/1985 | Klee et al. . |
| 4,598,501 | 7/1986 | Vasek . |
| 4,646,484 | 3/1987 | Brull . |
| 4,648,214 | 3/1987 | Brull et al. . |
| 4,759,156 | 7/1988 | Baumgart . |
| 4,793,103 | 12/1988 | Baumgart . |
| 4,872,975 | 10/1989 | Benson . |
| 4,979,338 | 12/1990 | Schmitz, II et al. . |
| 5,205,085 | 4/1993 | Urakami . |
| 5,676,588 | 10/1997 | Frederick et al. ........................ 451/86 |

*Primary Examiner*—David A. Scherbel
*Assistant Examiner*—Derris H. Banks
*Attorney, Agent, or Firm*—Pearne, Gordon, McCoy & Granger LLP

[57] ABSTRACT

A cryogen deflashing apparatus for removing residual flash from molded articles includes a receptacle assembly forming a sealed treatment chamber for the molded articles and a throwing wheel assembly for propelling particulate media against the molded articles. The throwing wheel assembly including a vaned impeller, an adjustable scroll housing, and an adjustable directional foil housing. The scroll housing partially encircles the impeller and has a surface shaped in the form of a volute. The impeller cooperates with the scroll housing to operate as a suction blower for evacuating cryogen gas and particulate media from a supply conduit. The directional foil housing forms an outlet of the throwing wheel assembly and directs cryogen gas and particulate media, accelerated by the impeller, directly toward the molded articles. The directional foil housing is angularly adjustable to longitudinally adjust impact of the particulate matter and includes vanes which laterally direct split streams of particulate matter to different locations within the receptacle assembly. The scroll and directional foil housings are particularly well suited for retrofitting existing cryogen deflashing machines.

18 Claims, 7 Drawing Sheets

SHOT BLASTER WITH IMPELLER/BLOWER

BACKGROUND OF THE INVENTION

The present invention generally relates to a cryogen deflashing apparatus and, more specifically, to a cryogen deflashing apparatus adapted to rapidly remove residual flash from molded articles.

Molded articles often have thin pieces of unwanted material extending therefrom called "flash" which must be removed for the articles to reach their desired final configuration. Removing flash from articles formed from flexible materials such as rubber, plastics, and the like, is difficult in view of the soft, elastic nature of flexible materials. While various types of mechanical trimming operations have been proposed for removing unwanted flash, these methods have proven to be uneconomical in a number of applications.

In order to both simplify and reduce the cost of flash removal, various attempts have been made to freeze or otherwise cool the articles in order to embrittle the thin sectioned flash, whereafter the embrittled flash is broken-off, trimmed, or otherwise removed. Some of these methods utilize a two-stage process wherein the workpieces are cooled in a first stage to effect flash embrittlement and then vibrated, tumbled, or otherwise mechanically treated in a second stage to break away the embrittled flash. One approach is to use a cryogen material, such as liquid nitrogen, to effect embrittlement of the workpiece flash. As utilized herein, the term "cryogen" will be understood to refer broadly to fluids which are at temperatures of about −60° F. and below.

Two-stage processes, however, are undesirable from several viewpoints. They are time consuming to carry out because cooling the workpieces and removing their flash comprise separate steps that are carried out sequentially rather than concurrently. Because the workpieces are cooled only once and will not be cooled again at other stages of the flash removal procedure, adequate time must be devoted at the outset to providing a thorough cooling of the workpieces to assure that they are refrigerated to an extent that their flash will remain embrittled throughout the remainder of the flash removal process. Sometimes the extensive degree of refrigeration which is required results in the generation of undesirable stresses and/or the formation of cracks or other types of structural defects in the workpieces. An equally troubling drawback of the two-stage processes is that, when there is a relatively large quantity flash to be removed, the workpieces may not remain adequately embrittled during the entire time required for deflashing. Where such is the case, the workpieces are not properly deflashed.

These drawbacks have been overcome by shot blast deflashing machinery which operate with a single flash embrittling and removing stage. For example, see U.S. Pat. Nos. 4,519,812, 4,598,501, 4,646,484, and 4,648,214 and U.S. patent application Ser. No. 08/542,447, filed Oct. 12, 1995, the disclosures of which are expressly incorporated herein in their entirety by reference. While such machinery performs in an exemplary manner, there is a never ending desire to decrease the required time and/or cost of a deflashing operation. Accordingly, there is a need in the art for an improved cryogen shot-blast deflashing machine which more rapidly removes residual flash from molded articles and/or for means of converting existing deflashing machines, in a cost effective manner, to more rapidly remove residual flash from molded articles.

SUMMARY OF THE INVENTION

The present invention provides a cryogen deflashing apparatus adapted to rapidly remove residual flash from molded articles. According to the present invention, the cryogen deflashing apparatus includes a receptacle assembly which forms a sealed treatment chamber for the molded articles, a cryogen supply line in fluid flow communication with the treatment chamber, and a throwing wheel assembly for propelling particulate media against the molded articles. The apparatus also includes a withdrawal conduit in fluid communication with the treatment chamber, a supply conduit in fluid communication with the throwing wheel assembly, and a blower connecting the withdrawal conduit and the supply conduit for evacuating cryogen gas from the treatment chamber and directing a flow of cryogen gas into the supply conduit. The throwing wheel assembly includes a vaned impeller and an enclosure having at least a portion shaped in the form of a volute so that the impeller and the enclosure cooperate to operate as a suction blower. The throwing wheel assembly thereby evacuates cryogen gas and particulate media from the supply conduit to obtain an increased flow of cryogen gas and particulate media through the throwing wheel assembly.

According to a preferred embodiment of the present invention, the enclosure includes a shroud which generally encloses the impeller except for an opening facing the treatment chamber and a scroll housing partially closing the opening and partially encircling the impeller. The scroll housing has an inner surface which forms the volute. Preferably, the scroll housing is adjustable relative to the impeller. The scroll housing can advantageously be added to an existing throwing wheel assembly to convert the throwing wheel assembly to a suction blower.

According to another aspect of the invention, the enclosure includes a directional foil which forms an outlet of the throwing wheel assembly. Preferably, the directional foil housing is angularly adjustable to longitudinally adjust impact of the particulate media projected from the throwing wheel assembly. The directional foil housing also preferably includes at least one directional vane to laterally adjust impact of the particulate media projected from the throwing wheel assembly. The directional foil housing can advantageously include at least two spaced apart vanes to create a split stream of particulate media to impact the molded articles at different locations in the receptacle assembly.

BRIEF DESCRIPTION OF THE SEVERAL VIEWS OF THE DRAWINGS

These and further features of the present invention will be apparent with reference to the following description and drawings, wherein.

DETAILED DESCRIPTION OF PREFERRED EMBODIMENTS

FIGS. 1–4 illustrate a shot blaster or cryogen shot-blast deflashing apparatus or machine 10 incorporating a preferred embodiment of the present invention. The deflashing machine includes a receptacle assembly 12, a support structure 14 for supporting the receptacle assembly 12, and a supply and recirculation system 16 which supplies and recirculates cryogen and deflashing or particulate media to the receptacle assembly 12.

The receptacle assembly 12 includes a drum 18 and an enclosure 20 which enshrouds the drum 18 and forms a cryogenic chamber. The drum 18 is rotatable about its central longitudinal axis 22 and defines a treatment chamber therein. Workpieces to be deflashed are positioned within the treatment chamber so that a deflashing operation can be carried out in a cryogenic environment which is established within the enclosure 20 as will be explained in more detail hereafter.

The drum 18 has a cylindrically-shaped side wall 24 and an end wall 26 which closes one end of the side wall 24. The side wall 24 and the end wall 26 are preferably formed by a single casting. openings 28 are formed through the side wall 24 at spaced intervals. The openings 28 are covered by screens 30 which permit particles and cryogen gas to escape from the treatment chamber into the closed cryogen chamber defined about the drum 18 within the enclosure 20. The structure of the side wall 24, which defines the openings 28, also serves the function of engaging the workpieces in the drum 18 as the drum 18 rotates to facilitate tumbling of the workpieces.

The enclosure 20 includes a rear housing 32 forming a closed end of the enclosure 20, a front housing 34 forming an open end of the enclosure, a shroud 36 connecting the rear housing 32 and the front housing 34, and a door 38 selectively providing and precluding access to the interior of the enclosure 20 through the front housing 34. The rear housing 32 has a generally cylindrically-shaped side wall 40 that circumferentially surrounds a rearward end region of the drum 18 and an end wall 42 which closes an end of the side wall 40 adjacent the end wall 26 of the drum 18. The side wall 40 and the end wall 42 of the rear housing 32 are preferably formed from a single casting. A plurality of cast arms 44 extend forwardly from the rear housing 32 and support the annularly-shaped front housing 34 that surrounds a forward end region of the drum 18. The shroud 36 is cylindrically-shaped and bridges the space between the rear and front housings 32, 34. The rear housing 32 also has stub shafts 46 which project from opposite sides thereof.

The door 38 closes the open end of the front housing 34 to complete the enclosure 20 which surrounds the drum 18 and defines the closed cryogenic chamber. The door 38 has an operating arm 48 which extends between and is pivotally connected to a pair of spaced-apart and upstanding ears 50. The ears 50 project upwardly from and are rigidly connected to the front housing 34. A pneumatic cylinder 52 is carried atop the enclosure 20 and has cylinder or body 54 and a ram or rod 56 which selectively extends and retracts from the body 54. The body 54 is connected to a bracket 58 rigidly secured to the rear housing 32. A yoke 60 connects the rod 56 with the operating arm 48 so that the door 18 pivots between an open position and a closed position about a horizontal axis 62 perpendicular to the central axis 22 of the drum 18.

Figure 1:
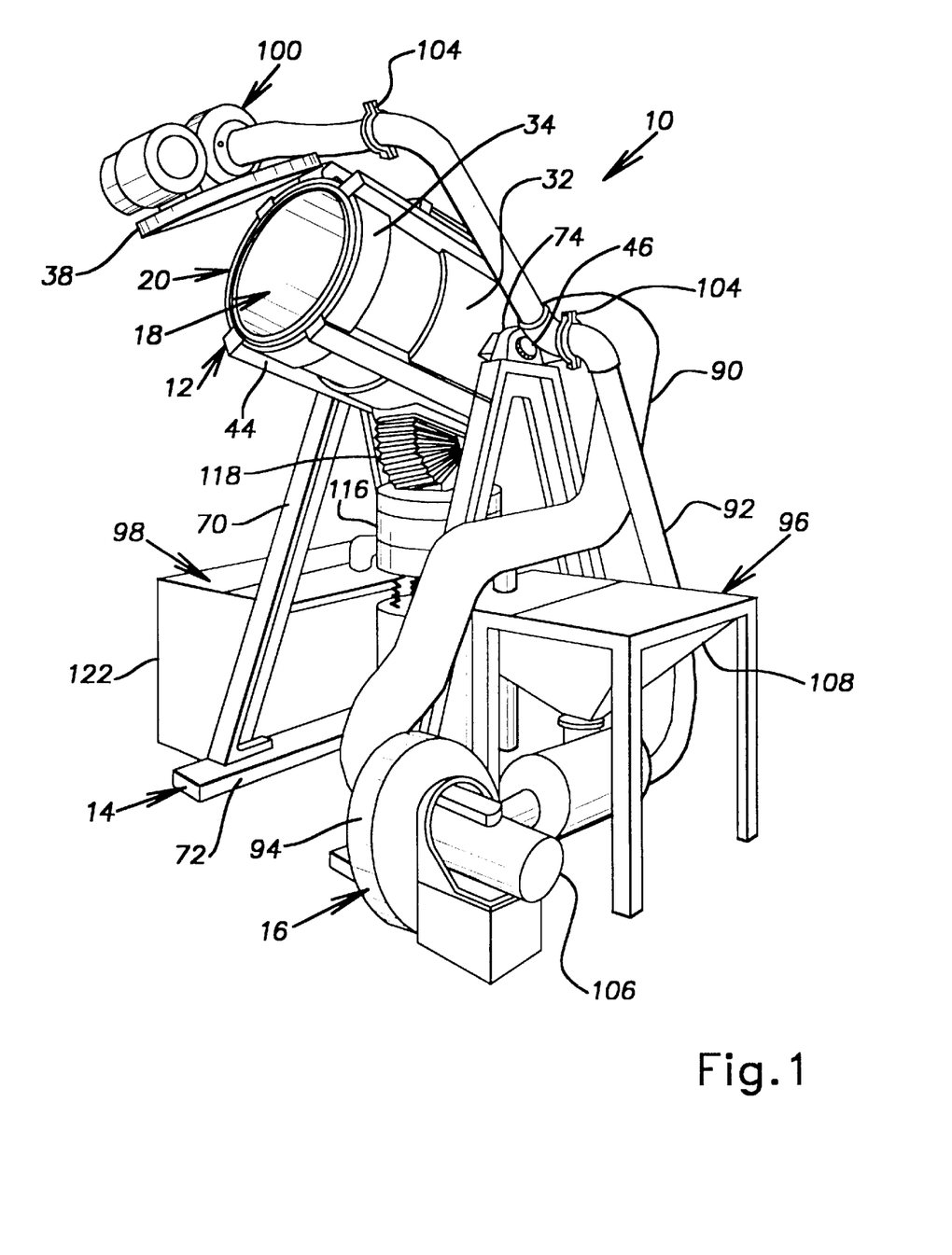
FIG. 1 is a perspective view of a cryogen shot-blast deflashing machine according to the present invention with a door open for loading molded articles to be deflashed.
Figure 2:
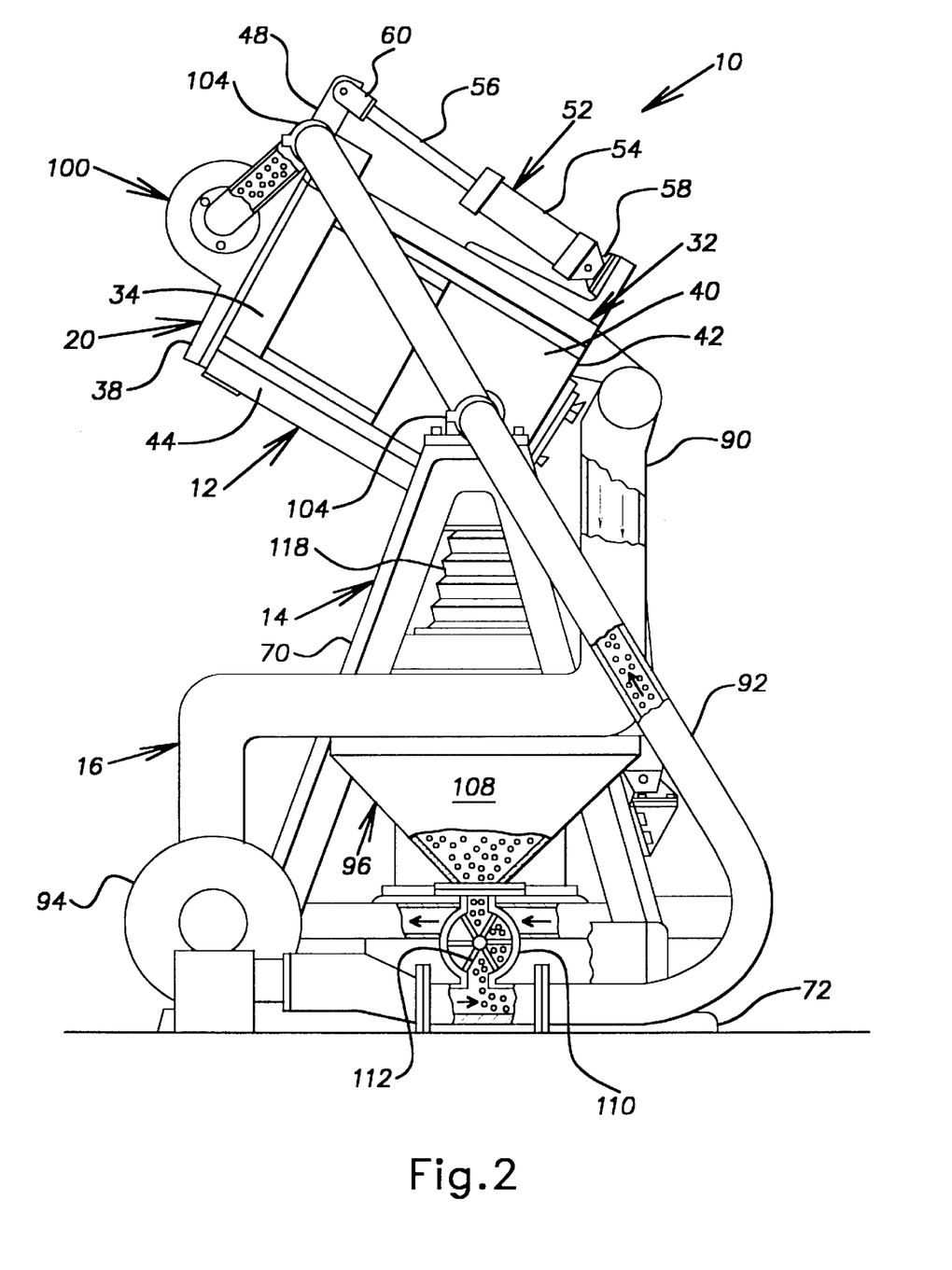
FIG. 2. is a side elevational view of the deflashing machine of FIG. 1 with the door closed and portions of the machine broken away and shown in cross-section.
Figure 3:
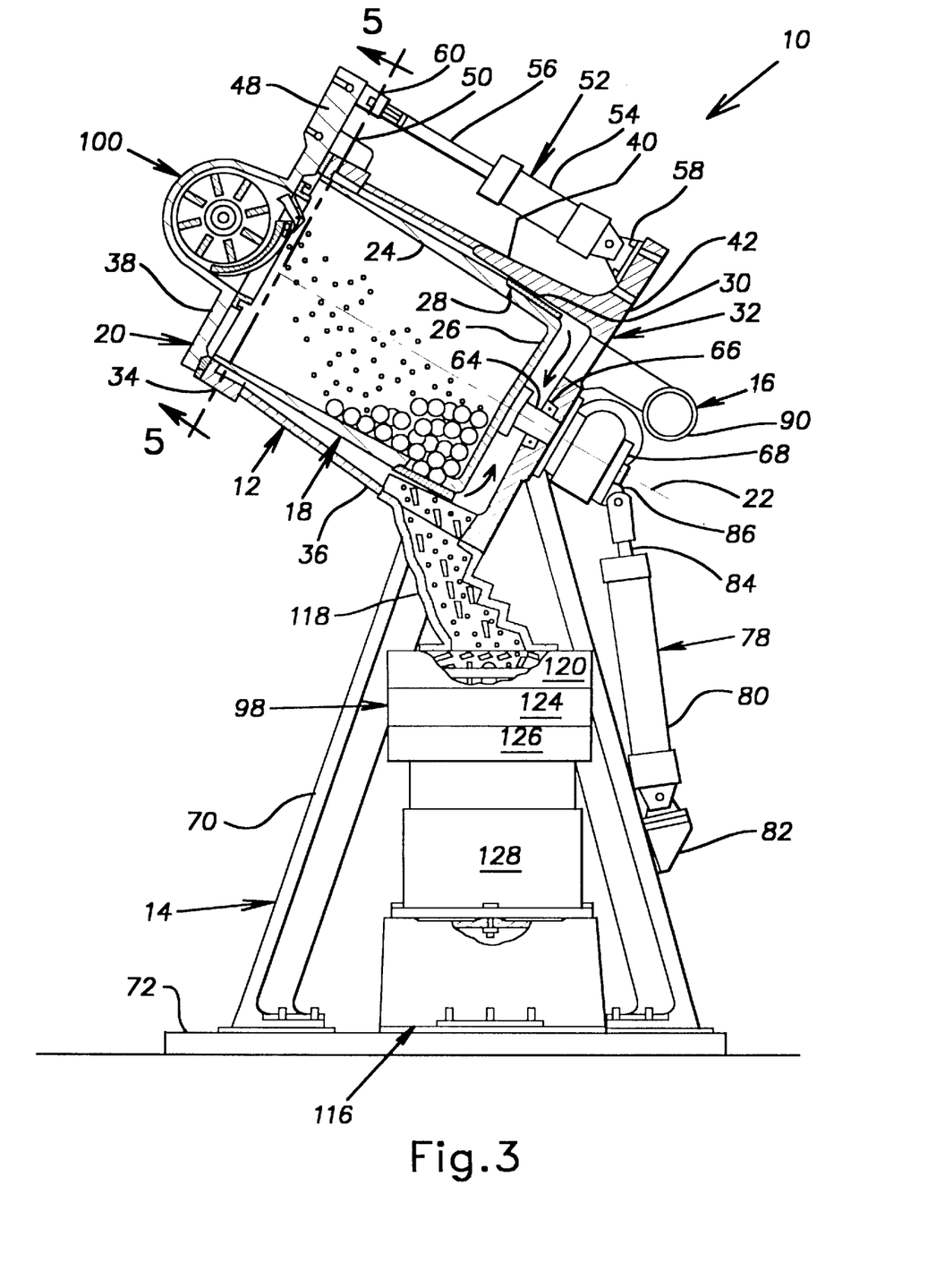
FIG. 3 is a side elevational view similar to FIG. 2 but with portions of the deflashing machine removed for clarity and portions of the deflashing machine broken away and shown in cross-section to illustrate operation of certain portions of the deflashing machine during a deflashing cycle.
Figure 4:
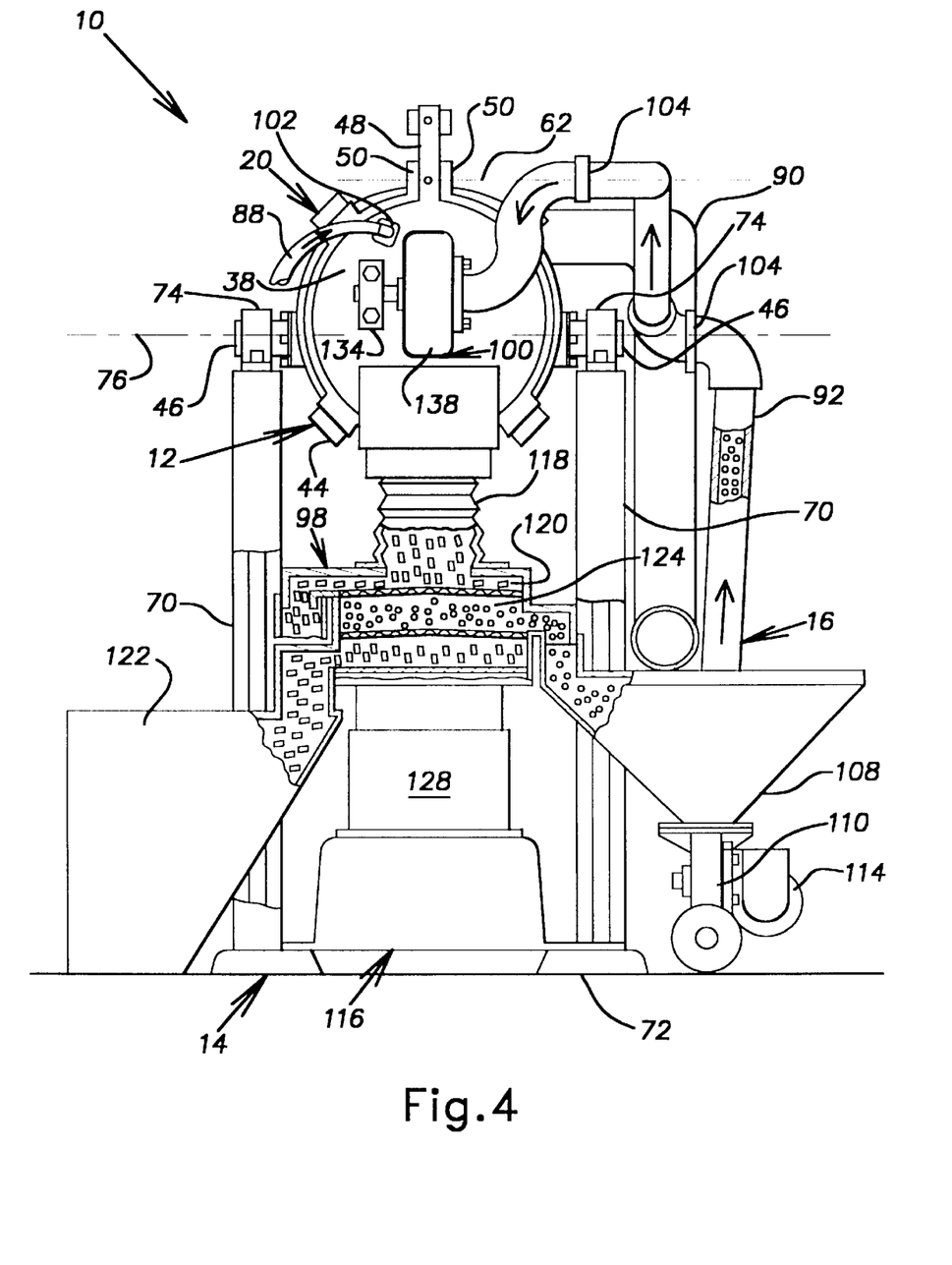
FIG. 4 is a front elevational view of the deflashing machine of FIG. 1 with the door closed, the treatment receptacle substantially horizontal, portions of the deflashing machine removed for clarity, and portions of the deflashing machine broken away and shown in cross-section to illustrate operation of certain portions of the deflashing machine during a deflashing cycle.

As best shown in FIG. 3, a stub shaft 64 is secured to the outside of the drum end wall 26 and is journaled in a bearing assembly 66 in the end wall 42 of the rear housing 32, whereby the drum 18 is supported in a cantilevered fashion and is journaled for rotation about the central axis 22. A variable-speed drive motor 68 is secured to the outside of the rear housing end wall 42 and is drivingly connected with the stub shaft 64 of the drum 18 to rotate the drum 18 at selected speeds of rotation.

The support structure 14 includes a pair of upstanding A-frame members 70 which are interconnected by a horizontal U-shaped base member 72. Bearing block assemblies 74 are carried atop the A-frame members 70 which journal the stub shafts 46 of the receptacle assembly 12 to pivotally support the receptacle assembly 12 between the A-frame members 70. The receptacle assembly 12, therefore, is pivotable about a horizontally extending pivot axis 76 which is substantially perpendicular to the central axis 22 of the drum 18.

As best seen in FIG. 3, a pneumatic cylinder 78 is interposed between the support structure 14 and the receptacle assembly 12 to pivot the receptacle assembly 12 about the pivot axis 76 (FIG. 4) between an upwardly oriented position and a downwardly oriented position. The pneumatic cylinder 78 can also position the receptacle assembly 12 at any intermediate position therebetween. The pneumatic cylinder 78 includes a cylinder or body 80 which is pivotally connected to a bracket 82 secured to the A-frame members 70 of the support structure 14. The pneumatic cylinder 78 also has a rod 84 which selectively extends and retracts from the body 80. The rod 84 is pivotally connected to a positioning arm 86 rigidly connected to the enclosure rear housing 32 of the receptacle assembly 12. The receptacle assembly 12 is selectively rotated about the pivot axis 76 in response to extension and retraction of the rod 84 of the pneumatic cylinder 78.

The supply and recirculation system 16 includes a cryogen supply line 88 for supplying cryogen such as, for example, liquid nitrogen to the treatment chamber, a withdrawal conduit 90 for removing cryogen gas from the cryogen chamber, a supply conduit 92 for supplying cryogen gas and particulate media, a pressure/suction blower 94 for supplying a flow of pressurized cryogen gas to the supply conduit 92, a media supply 96 for supplying particulate media to the supply conduit 92, a media separating system 98 for separating reusable particulate media from waste particles, and a throwing-wheel/suction-blower assembly 100 for blasting or directly impinging workpieces within the treatment chamber with a stream of cryogen gas and particulate media. The cryogen supply line 88 connects the treatment chamber with a source of pressurized cryogen which is maintained at a temperature which is lower than a temperature desired to be maintained in the treatment chamber during a deflashing operation. The cryogen supply line 88 is connected to a fitting 102 which cooperates with a threaded opening through the door 38 of the enclosure 20. The cryogen supply line 88 includes a conventional power-operated valve (not shown) for controlling the flow of cryogen into the treatment chamber so that cryogen is added to the treatment chamber only when the temperature within the treatment chamber is sensed as being higher than the desired temperature.

The withdrawal conduit 90 evacuates cryogen gas from an upper portion of a rear part of the receptacle assembly 12. The withdrawal conduit 90 has a first or inlet end secured to the top of the rear housing end wall 42 of the receptacle assembly 12 and a second or outlet end secured to an inlet of the blower 94. The withdrawal conduit 90 connects the interior of the cryogen chamber with the inlet of the blower 94.

The supply conduit 92 directs cryogen gas from the blower 94 to the throwing-wheel/suction-blower assembly 100. The supply conduit 92 has a first or inlet end secured to an outlet of the blower 94 and a second or outlet end secured to the door 38 of the receptacle assembly 12. The supply conduit 92 thereby connects the outlet of the blower 94 with an inlet of the throwing-wheel/suction-blower assembly 100. The supply conduit 92 includes a pair of pivotal joint assemblies 104 which enable sections of the supply conduit 92 to pivot as the receptacle assembly 12 pivots about the pivot axis 76.

The blower 94 receives cryogen gas from the withdrawal conduit 90 and delivers repressurized cryogen gas to the supply conduit 92. A variable-speed drive motor 106 is provided for driving the blower 94. The blower 94 operates in a push-pull fashion to establish a high velocity flow of cryogen gas. The blower 94 diminishes pressure within the withdrawal conduit 90 to effectively pull or evacuate cryogen gas from the receptacle assembly 12 and increases the pressure within the supply conduit 92 to push or deliver pressurized cryogen gas to the throwing-wheel/suction-blower assembly 100.

The media supply 98 is interposed in the supply conduit 92 and introduces a controlled flow of particulate media into the flow of pressurized cryogen gas which is being delivered to the throwing-wheel/suction-blower assembly 100 through the supply conduit 92. The media supply 98 includes a media storage hopper 108 for storing a supply of particulate media and a metering valve 110 for dispensing a controlled flow of particulate media from the hopper 108 to the supply conduit 92. The metering valve 110 of the illustrated embodiment includes a vaned rotor 112 which is driven by a variable-speed drive motor 114.

The media separating system 98 withdraws particulate, including both particles of flash and particulate media, from the receptacle assembly 12, separates reusable particulate from the withdrawn particulate, and ducts the reusable particulate media to the media storage hopper 108. The media separating system 98 includes a three stage separator unit 116 and a bellows 118 which connects the receptacle assembly 12 with the separating unit 116. The bellows 118 has an upper or inlet end connected to the bottom of the enclosure rear housing 32 of the receptacle assembly 12 and a lower or outlet end secured to the top of the separating unit 116. The bellows 118 is a flexible accordion-type bellows which allows the receptacle assembly 12 move about the pivot axis 78.

The separator unit 116 has a first or upper stage 120 that removes large particles of flash and delivers the large particles to a waste bin 122, a second or middle stage 124 which withdraws reusable particulate media and delivers the reusable particulate media to the media storage hopper 108, and a third or lower stage 126 which delivers any remaining small particles of flash and other small waste particulate to the waste bin 122. A conventional vibratory drive system 128 vibrates the particulate within the various stages 120, 124, 126.

Figure 5:
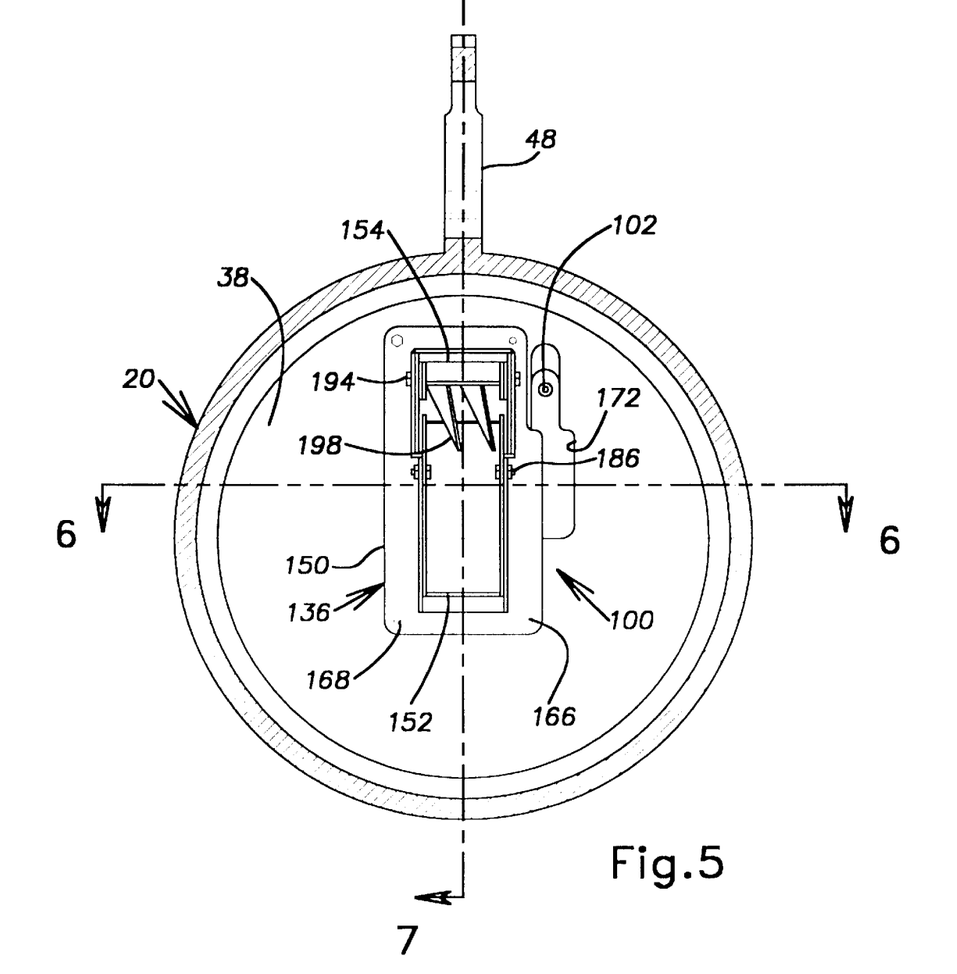
FIG. 5 is an enlarged view taken along line 5—5 of FIG. 3 showing a throwing wheel assembly of the deflashing machine.
Figures 6, 7:
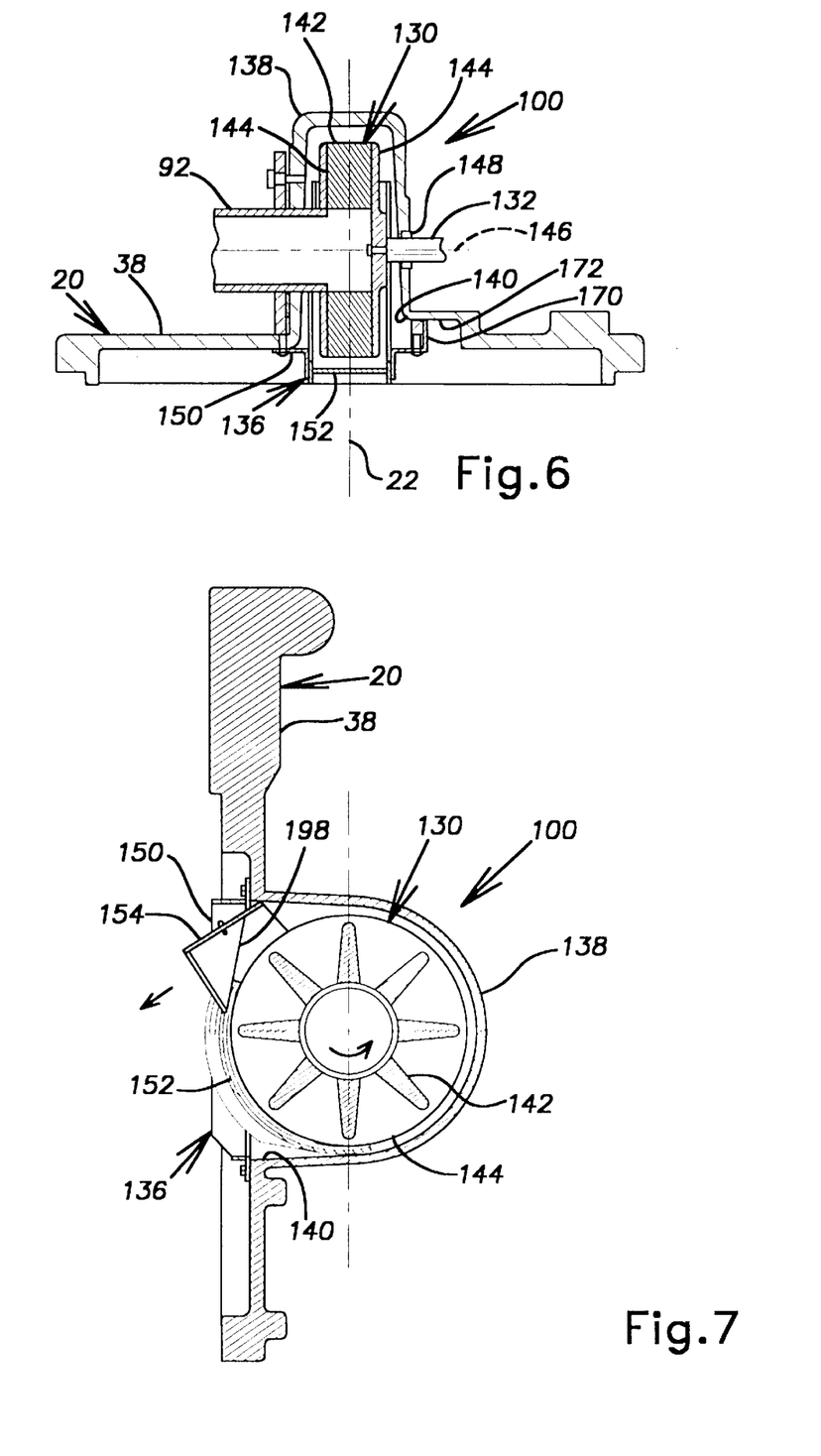
FIG. 6 is a cross-sectional view taken along line 6—6 of FIG. 5.
FIG. 7 is a cross-sectional view taken along line 6—6 of FIG. 5.

As best shown in FIGS. 5–7, the throwing-wheel/suction-blower assembly 100 is supported by the door 38 of the enclosure 20 and includes a vaned rotor or impeller 130, a shaft 132, an electric variable-speed motor 134 (FIG. 4), and an enclosure or housing. The enclosure includes a scroll/foil assembly 136 and a cowling or shroud 138. The shroud 138 is cast within the door 38 and generally encloses or surrounds the impeller 130. The shroud 138 has a closed forward end and an open rear end which faces and opens into the treatment chamber. The forward end has a generally constant radius while the rear end increases in size in a generally tangential manner to a rectangularly-shaped rear opening 140.

The impeller 130 includes a plurality of radially extending blades or vanes 142 sandwiched between a pair of circular plates 144. The shaft 132 supports the impeller 130 for rotation within the shroud 138 on a substantially horizontal rotational axis 146 substantially perpendicular to the drum central axis 22. The shaft 132 is journaled by bearings 148 carried on the door 38. The motor 134 is mounted on the exterior side of the door 38 and is drivingly connected to the shaft 132 for rotating the impeller 130 within the shroud 138 at controlled speeds of operation. A flow of cryogen gas and particulate media is axially fed into center region of the impeller 130 by the supply conduit 92 which extends through the shroud 138 of the door 38 and one of the side plates 144 of the impeller 130. The supply conduit 92 is totally open, that is, the supply conduit 92 is not provided with a restriction device (as best shown in FIG. 6).

The scroll/foil assembly 136 is mounted at the opening 140 of the shroud 138 and includes a mounting bracket 150, a rotational or scroll housing 152, and a directional foil housing 154. The scroll/foil assembly 136 converts the throwing wheel or impeller 130 into a pressure blower, or more specifically a suction blower, using the shroud 138 which has existing or standard geometry and also enables the particulate media to be selectively directed to desirable locations within the drum 18. Each of the components of the scroll/foil assembly 136 can be made from any material suitable for use with cryogen and having a relatively high abrasion resistance such as, for example, stainless steels.

Figure 8:
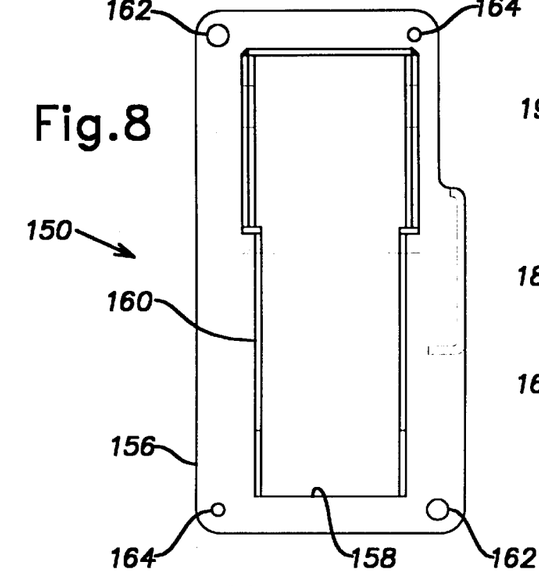
FIG. 8 is an elevational view of a mounting bracket of the throwing wheel assembly of FIG. 5.
Figure 9:
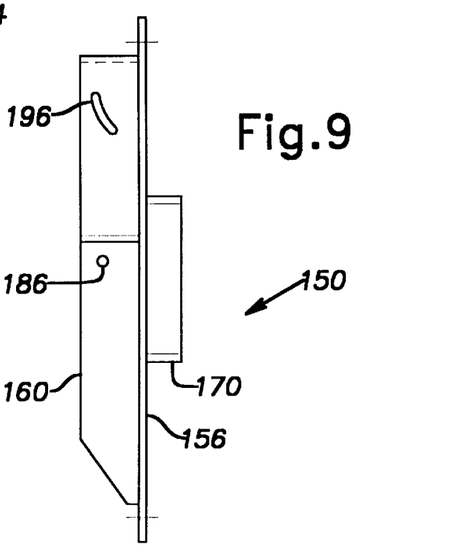
FIG. 9 is a side elevational view of the mounting bracket of FIG. 8.

As best shown in FIGS. 8 and 9, the mounting bracket 150 has a planer and rectangularly-shaped plate or wall 156 with a generally rectangularly-shaped opening therein 158. A flange 160 rearwardly extends from the wall 156 along the sides and top of the opening 158. The flange 160 is attached in any suitable manner such as welding. The wall 156 is sized to generally cover the shroud opening 140 in the door 38 and to engage the inner surface of the door 38. The wall 156 is provided with openings 162, 164 sized for receiving suitable fasteners 166 and locating pins 168, such as bolts and dowel pins, to secure and position the mounting bracket 150 to the door 38 (best shown in FIGS. 6 and 7). A further flange 170 forwardly extends from the wall 156 which is sized and shaped to close a depression or recess 172 located in the inner surface of the door 38 which is contiguous with the shroud opening 140 (best shown in FIG. 6).

Figure 10:
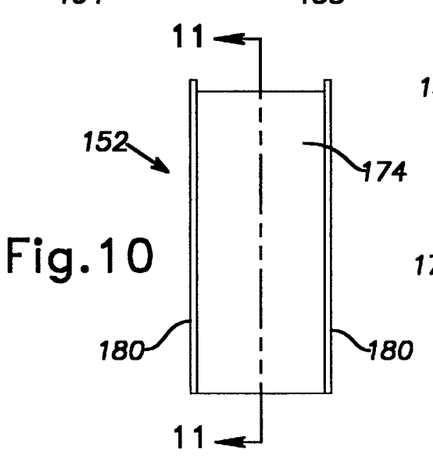
FIG. 10 is an elevational view of a rotational housing of the throwing wheel assembly of FIG. 5.
Figure 11:
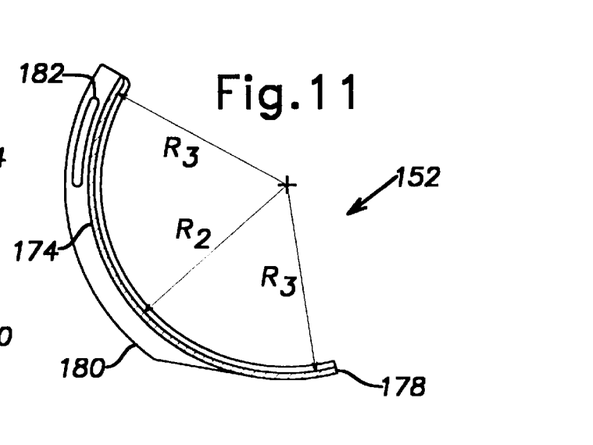
FIG. 11 is a side elevational view, in cross-section, of the rotational housing of FIG. 10.

As best shown in FIGS. 10 and 11, the scroll housing 152 has a curved main wall 174 with an increasing radius from a top edge 176 to a bottom edge 178, that is, $R_1 < R_2 < R_3$. The wall 174 is sandwiched between a pair of side walls 180 which are attached in any suitable manner such as welding. The side walls 180 are spaced apart a distance suitable to cooperate with the flange 160 of the mounting bracket 150 so that the scroll housing 152 can be secured to the mounting bracket 150 within a lower portion of the opening 158. Each side wall 180 is provided with a curved slot 182, near the top edge 176 and at the rear side of the main wall 174, which is sized for receiving a suitable fastener 184, such as the illustrated bolt and nut, to secure the scroll housing 152 to the mounting bracket 150 (best shown in FIG. 5). As shown in FIGS. 8 and 9, suitable openings 186 are provided in a bottom portion of the mounting bracket flange 160 which are sized for receiving the fasteners 184.

As best shown in FIGS. 5–7, the scroll housing 152 generally closes the opening 140 of the door shroud 138. The scroll housing 152 also extends within the shroud 138 below the impeller 130 and surrounds a substantial portion of the impeller 130, preferably over 90 degrees of the impeller 130. In the illustrated embodiment, the scroll housing 152 surrounds about 135 degrees of the impeller 130. The scroll housing 152 generally extends from the directional foil housing 154 to the bottom of the impeller 130. Positioned in this manner the scroll housing 152 forms a volute, that is, the distance from the center of the impeller 130 to the inner surface of the scroll housing wall 174 increases in the direction of rotation of the impeller (clockwise as viewed in FIG. 7). The impeller 130 cooperates with the volute of the scroll housing 152 to create a vacuum as the impeller rotates. Therefore, the volute converts the impeller 130 into a suction/pressure blower which pulls or draws cryogen gas and particulate media from the supply conduit 92, thereby reducing back pressure in the supply conduit 92 and increasing the flow of cryogen gas and particulate media through the impeller 130. Note that the scroll housing 152 is removably mounted and provided with the adjustment slot 182 so that the position of the scroll 152 can be adjusted and/or optimized.

Figure 12:
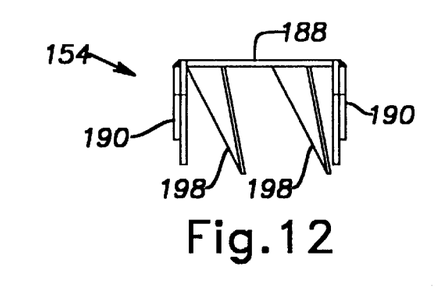
FIG. 12 is an elevational view of a directional foil housing of the throwing wheel assembly of FIG. 5.
Figure 13:
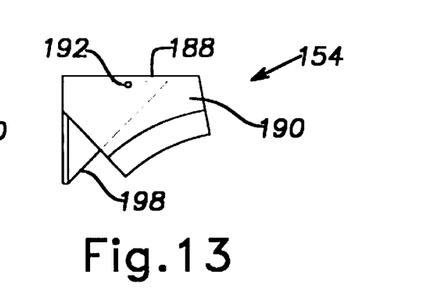
FIG. 13 is a side elevational view of the directional foil housing of FIG. 12.

As best shown in FIGS. 12, and 13, the directional foil housing 154 has a top plate or wall 188 and a pair of side walls 190 downwardly extending from opposite sides of the top wall 188. The side walls 190 are attached in any suitable manner such as welding. The side walls 190 are spaced apart a distance suitable to cooperate with the flange 160 of the mounting bracket 150 so that the foil housing 154 can be secured to the mounting bracket 150 within an upper portion of the opening 158. Each side wall 190 is provided with a threaded opening 192 at the top portion thereof which is sized for receiving a suitable fastener 194, such as the illustrated bolt, to secure the foil housing 154 to the mounting bracket 150 (best shown in FIG. 5). As shown in FIGS. 8 and 9, curved slots 196 are provided in a top portion of the mounting bracket flange 160 which are sized for receiving the fasteners 194.

As best shown in FIGS. 5–7, the directional foil housing 154 is located above the scroll housing 152 and forms an aperture or outlet. The directional foil housing 154 directs cryogen gas and particulate media accelerated by the impeller 130 of the throwing wheel/suction-blower assembly 100 toward the workpieces. The directional foil housing 154 is removably mounted and provided with the adjustment slots 196 so that the direction of the stream of cryogen gas and particulate media can be longitudinally adjusted and/or optimized along the length of the drum 18 for particular workpieces. The directional foil housing 154 is preferably adjustable to direct cryogen gas and particulate media over the range of the front or open end of the drum side wall 24 to the top of the drum end wall 26. In the illustrated embodiment, the directional foil housing 154 is adjustable over a range of about 10 degrees to about 40 degrees below horizontal.

As best shown in FIGS. 12 and 13, the directional foil housing 154 has a pair of spaced apart directional vanes 198. The vanes 198 are triangularly-shaped and downwardly extend from the top wall 188. The vanes 198 are attached in any suitable manner such as welding. The vanes 198 are oriented to laterally direct the cryogen gas and particulate media to a desired position within the drum 18. In the illustrated embodiment, the vanes 198 are angled (to the right as viewed in FIGS. 5 and 12) to direct the cryogen gas and particulate media to the left (as viewed looking into the open end of the drum 18) to directly impinge the tumbling workpieces in the clockwise rotating drum 18 (as viewed looking into the open end of the drum 18). Specifically, the directional vanes are angled about 16 degrees from the longitudinal direction and are tilted about 10 degrees from vertical.

The spaced apart vanes 198 form split streams with one stream directed generally toward a middle portion of the drum 18 and another stream directed generally toward the left or tumbling side of the drum 18. It is noted that the directional foil 154 can alternatively have a greater or smaller number of directional vanes 198 or could have no directional vanes 198 depending on the desired number and/or location of impact zones. It is also noted that the directional vanes 198 can alternatively be oriented to direct the cryogen gas and particulate media in other directions such as, to the right if the drum is rotating counter clockwise.

To start a deflashing operation, the door 38 is opened and workpieces to be deflashed are inserted into the treatment chamber within the drum 18. The door 38 is closed, rotation of the drum 18 is started, and the flow of cryogen and particulate media through the machine 10 is started by opening the cryogen supply line 88, starting the blower 94, starting the metering valve 110, and by starting the throwing-wheel/suction-blower assembly 100.

During the deflashing operation, the motor 134 rotates the impeller 130 about the rotational axis 146. The vanes 142 of the rotating impeller 130 cooperate with the scroll housing 152 to create a low static pressure and pull cryogen gas and particulate media from the supply conduit 92 into the central portion of the impeller 130. The cryogen gas and particulate media are accelerated and projected outwardly, under centrifugal force supplied by the rotating vanes 142 of the impeller 130, through the directional foil housing 154. The directional foil housing 154 longitudinally directs the cryogen gas and particulate media to directly impinge the workpieces at the rear end of the drum side wall 24. The vanes 198 of the directional foil housing 154 create two streams of flow wherein one stream is directed toward a middle portion of the drum 18 and another stream is laterally directed toward the left side of the drum side wall. Thus, the throwing-wheel/suction-blower assembly 100 operates to pull cryogen gas and particulate media from the supply conduit 92, to project a flow of cryogen gas and particulate media into the drum 18, and to direct the flow of cryogen gas and particulate media to directly impact workpieces in the treatment chamber.

Cryogen gas discharges from the treatment chamber through the screened openings 28 and is pulled into and through the withdrawal conduit 90 by the blower 94. The blower 94 represurizes the withdrawn cryogen gas and ducts pushes the cryogen gas into the supply conduit 90. The pressurized cryogen gas travels at relatively high velocity through the supply conduit 92 back to the throwing-wheel/suction-blower assembly 100. The cryogen gas is "pushed" by the blower 94 and "pulled" by the throwing-wheel/suction-blower assembly 100.

Particulate, such as removed flash and particulate media, also discharges from the treatment chamber through the screened openings 28. The particulate falls through the bellows 118 into the separator unit 116. The separator unit 116 segregates reusable particulate media and ducts it into the storage hopper 108. The particulate media flows under the influence of gravity through the hopper 108 and is introduced into the pressurized flow of cryogen gas within the supply conduit 92 in a controlled manner by the metering valve 110. The particulate media returns to the throwing-wheel/suction-blower assembly 100 through the supply conduit 92 in the high velocity stream of cryogen gas. Waste particulate, including flash and the like, is ducted by the separator unit 116 into the waste bin 122.

Once a deflashing operation has been completed, the flow of cryogen and particulate media through the machine 10 is stopped by cutting off the supply line 88, stopping the blower 94, stopping the metering valve 110, and by stopping the throwing-wheel/suction-blower assembly 100. The receptacle assembly 12 is tilted to its downward oriented position and the door 38 is opened, whereupon deflashed workpieces are discharged from the treatment chamber into an awaiting receptacle (not shown). The door 38 is preferably closed as soon as possible to minimize the escape of cryogen from the machine 10 and to minimize the entry of moisture into the machine 10.

As will be apparent from the forgoing description, the present invention has novel and improved features that include advances in both method and apparatus. The present invention enables an increased flow rate of cryogen gas and particulate media, due to the restrictionless throwing-wheel/suction-blower assembly 100, which drastically reduces the cycle time of a deflashing operation. Additionally, media conduits and valves are less likely to clog because of reduced back pressure, due to the throwing-wheel/suction-blower assembly 100, which reduces maintenance or down time. Furthermore, the workpieces are directly impinged or impacted by the particulate media, due to the directional foil housing 154, which also drastically reduces the cycle time of a deflashing operation. Even furthermore, the invention enables existing machines to be easily and cost effectively retrofitted. In operational tests, existing machines were retrofitted and found to have drastically reduced cycle times. Specifically the retrofitted machines deflashed 21 pounds of workpieces in 5 minutes compared to previously deflashing 11 pounds in 12 minutes.

Although particular embodiments of the invention have been described in detail, it will be understood that the invention is not limited correspondingly in scope, but includes all changes and modifications coming within the spirit and terms of the claims appended hereto.

What is claimed is:

1. A cryogen deflashing apparatus for removing residual flash from molded articles with particulate media, said cryogen deflashing apparatus comprising a receptacle assembly forming a sealed treatment chamber for the molded articles, a cryogen supply line in fluid flow communication with said treatment chamber, a throwing wheel assembly for propelling particulate media into the treatment chamber, a withdrawal conduit in fluid communication with said treatment chamber, and a supply conduit in fluid communication with said throwing wheel assembly, said withdrawal conduit and said supply conduit cooperating to provide a flow path for cryogen gas from said treatment chamber to said throwing wheel assembly, said throwing wheel assembly including a vaned impeller and an enclosure having at least a portion shaped in the form of a volute, said impeller and said enclosure cooperating to operate as a suction blower for evacuating cryogen gas and particulate media from said supply conduit, wherein an exit of said supply conduit is free of restriction devices so that cryogen gas and particulate media freely flow from said supply conduit into said throwing wheel assembly.

2. The cryogen deflashing apparatus according to claim 1, wherein said impeller and said enclosure cooperate to reduce pressure within said throwing wheel assembly and effectively pull cryogen gas from said supply conduit.

3. The cryogen deflashing apparatus according to claim 1, wherein said enclosure includes a shroud which generally encloses said impeller except for an opening which opens into said treatment chamber and a scroll housing partially closing said opening and partially encircling said impeller, said scroll housing having a surface forming said volute.

4. The cryogen deflashing apparatus according to claim 3, wherein said scroll housing is adjustable relative to said impeller.

5. The cryogen deflashing apparatus according to claim 3, wherein said scroll housing encircles a substantial portion of said impeller.

6. The cryogen deflashing apparatus according to claim 3, wherein said enclosure includes a directional foil housing at said opening and forming an outlet of the throwing wheel assembly.

7. The cryogen deflashing apparatus according to claim 1, wherein said enclosure includes a directional foil forming an outlet of said throwing wheel assembly, and said directional foil housing is angularly adjustable to longitudinally adjust impact of the particulate media projected from said throwing wheel assembly.

8. The cryogen deflashing apparatus according to claim 7, wherein said directional foil housing includes at least one directional vane to laterally direct impact of the particulate media projected from said throwing wheel assembly.

9. The cryogen deflashing apparatus according to claim 8, wherein said directional foil housing includes at least two spaced apart vanes to create a split stream of particulate media.

10. A cryogen deflashing apparatus for removing residual flash from molded articles. with particulate media, said cryogen deflashing apparatus comprising a receptacle assembly forming a sealed treatment chamber for the molded articles, a cryogen supply line in fluid flow communication with said treatment chamber, a throwing wheel assembly for propelling particulate media into said treatment chamber, a conduit providing a flow path for cryogen gas from said treatment chamber to said throwing wheel assembly, said throwing wheel assembly including a vaned impeller, a shroud generally enclosing said impeller except for an opening which opens into said treatment chamber, and a scroll housing partially closing said opening and partially encircling said impeller, said scroll housing having a surface shaped in the form of a volute, said impeller and said scroll housing cooperating to operate as a suction blower for evacuating cryogen gas and particulate media from said supply conduit.

11. The cryogen deflashing apparatus according to claim 10, wherein said impeller and said scroll housing cooperate to reduce pressure within said throwing wheel assembly and effectively pull cryogen gas from said supply conduit.

12. The cryogen deflashing apparatus according to claim 11, wherein said scroll housing is adjustable relative to said impeller.

13. The cryogen deflashing apparatus according to claim 10, wherein an exit of said supply conduit is free of restriction devices so that cryogen gas and particulate media freely flow from said supply conduit into said throwing wheel assembly.

14. The cryogen deflashing apparatus according to claim 10, wherein said throwing wheel assembly includes a directional foil housing at said opening and forming an outlet of the throwing wheel assembly.

15. A cryogen deflashing apparatus for removing residual flash from molded articles with particulate media, said cryogen deflashing apparatus comprising a receptacle assembly forming a sealed treatment chamber for the molded articles, a cryogen supply line in fluid flow communication with said treatment chamber, a throwing wheel assembly for propelling particulate media into said treatment chamber, and a conduit providing a flow path for cryogen gas from said treatment chamber to said throwing wheel assembly, said throwing wheel assembly including a vaned impeller, a shroud generally enclosing said impeller except for an opening which opens into said treatment chamber, and a directional foil at said opening and forming an outlet of said throwing wheel assembly, wherein said directional foil housing is angularly adjustable to longitudinally adjust impact of the particulate media projected from said throwing wheel assembly.

16. The cryogen deflashing apparatus according to claim 15, wherein said directional foil housing includes at least one directional vane to laterally direct impact of the particulate media projected from said throwing wheel assembly.

17. The cryogen deflashing apparatus according to claim 16, wherein said directional foil housing includes at least two spaced apart vanes to create a split stream of cryogen gas and particulate media.

18. The cryogen deflashing apparatus according to claim 15, wherein said throwing wheel further includes a scroll housing partially encircling said impeller and having a surface shaped in the form of a volute, said impeller and said scroll housing cooperating to operate as a suction blower for evacuating cryogen gas and particulate media from said supply conduit.

\* \* \* \* \*

UNITED STATES PATENT AND TRADEMARK OFFICE
CERTIFICATE OF CORRECTION

PATENT NO. : 5,879,223
DATED : March 9, 1999
INVENTOR(S) : Frederick et al.

It is certified that error appears in the above-indentified patent and that said Letters Patent is hereby corrected as shown below:

Column 3, Line 45, delete "openings" and insert
--Openings--.

Column 11, Line 9-10, Claim 12, delete "claim 11" and
insert --claim 10--.

Column 12, after Line 25, add --Claim 19.
The cryogen deflashing apparatus according to claim 10, wherein said scroll housing encircles a substantial portion of said impeller.--.

Signed and Sealed this

Twenty-fourth Day of August, 1999

Attest:

Q. TODD DICKINSON

Attesting Officer    Acting Commissioner of Patents and Trademarks